United States Patent [19]
Kato

[11] Patent Number: 5,256,467
[45] Date of Patent: Oct. 26, 1993

[54] HEAT-INSULATING CORRUGATED CARDBOARDS AND METHOD FOR MAKING THEM

[75] Inventor: Eiji Kato, No. 2-11, Higashiteraokitadai, Tsurumi-ku, Yokohama-shi, Kanagawa-ken, Japan

[73] Assignees: Nihon Dimple Carton Co., Ltd., Tokyo; Eiji Kato, Yokohama, both of Japan

[21] Appl. No.: 699,337

[22] Filed: May 13, 1991

[30] Foreign Application Priority Data

May 14, 1990 [JP] Japan .................................. 2-121160
Jan. 9, 1991 [JP] Japan ..................................... 3-11629

[51] Int. Cl.⁵ .............................................. B32B 3/28
[52] U.S. Cl. ..................................... 428/182; 428/215; 428/314.8; 428/315.7; 428/315.9; 52/799

[58] Field of Search ............... 428/182, 184, 185, 913, 428/178, 215, 314.2, 314.4, 315.7, 314.8, 315.9; 52/795, 799

[56] References Cited

U.S. PATENT DOCUMENTS 3,308,006  3/1967  Kresse et al. ....................... 428/182

Primary Examiner—Donald J. Loney
Attorney, Agent, or Firm—Oblon, Spivak, McClelland, Maier & Neustadt

[57] ABSTRACT

A corrugated cardboard includes a corrugated core sheet comprising a plastic sheeting having thereon a skin layer having a specific cell diameter and a plastic film laminated on at least one side of the corrugated sheet. This corrugated cardboard is improved in terms of heat insulation and so can be used for packing such materials as petals and perishables, while protecting them against heat and keeping them fresh. More preferably, shielders may be provided in the corrugated core sheet grooves. A specific method for making such cardboard products is also provided.

5 Claims, 7 Drawing Sheets

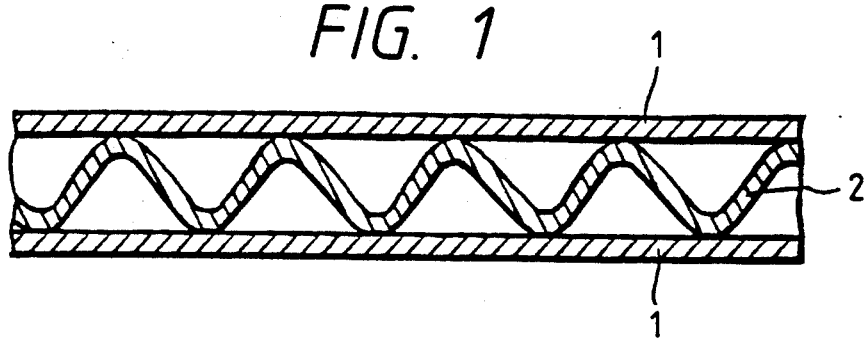
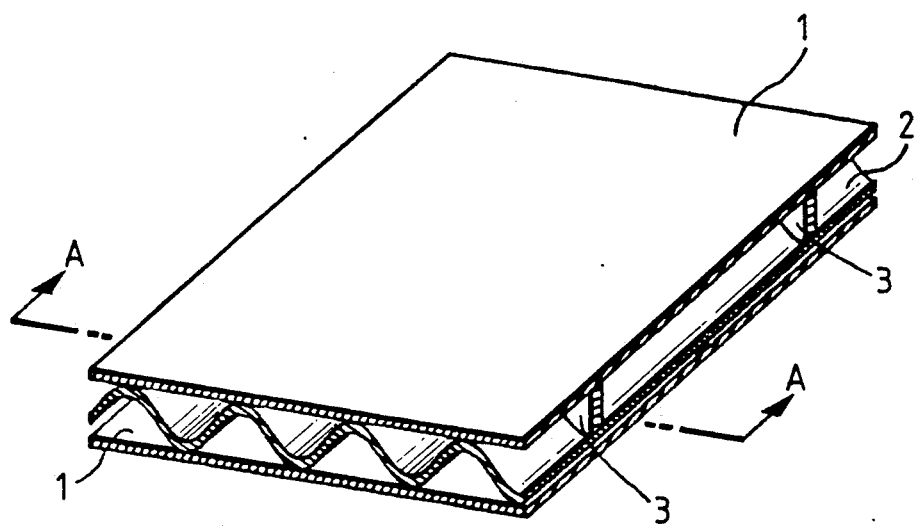
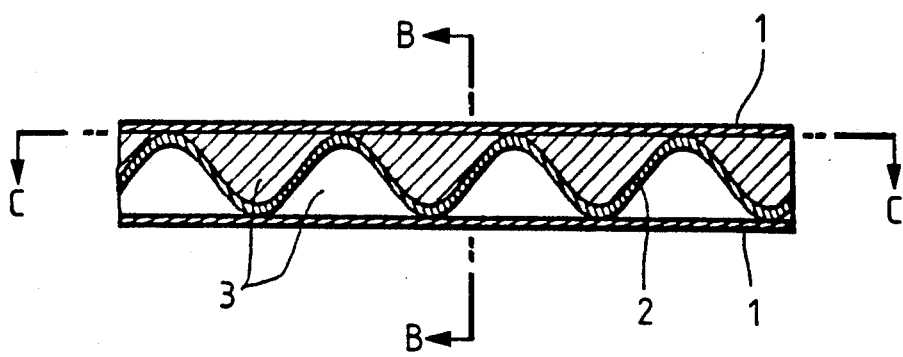

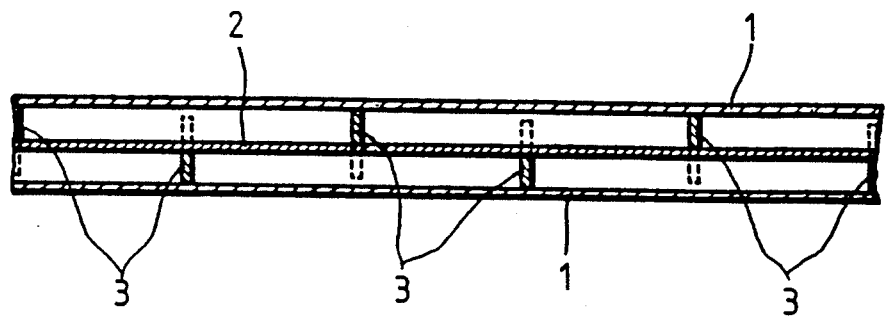
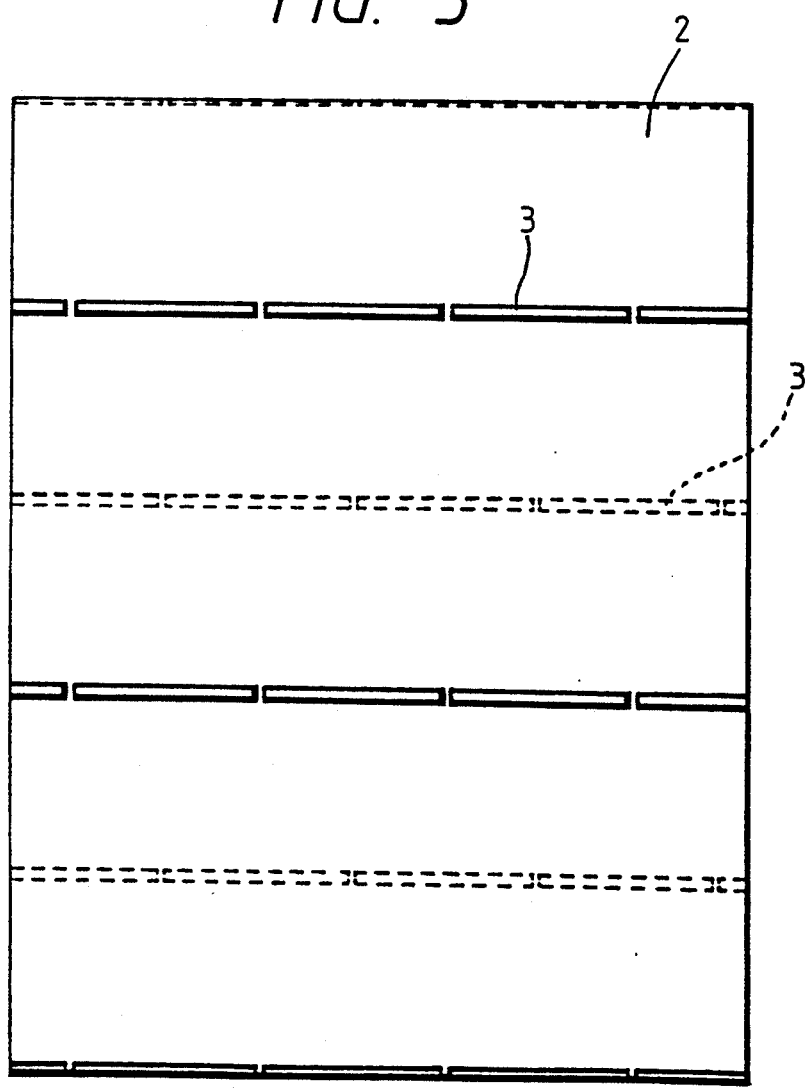

HEAT-INSULATING CORRUGATED CARDBOARDS AND METHOD FOR MAKING THEM

BACKGROUND OF THE INVENTION

The present invention relates to a packaging corrugated cardboard which is both lightweight and excellent in heat insulation. Specifically, this invention concerns a heat-insulating corrugated cardboard of great water-resistant strength, characterized in that its corrugated core is formed of a foamed plastic sheet which may be laminated on one side or both sides with a plastic film or films, and a method for making such a cardboard. More specifically, this invention is directed to a heat-insulating corrugated cardboard designed to be used as the packaging material which is required to protect petals or perishables against heat while keeping them fresh and/or to have resistance to scratching and scuffing and shock absorption, and a method for making it.

PRIOR ART

So far, box members formed of foamed polystyrene resin by injection molding have been used in fields for which high degrees of heat insulation are demanded. These members excel in heat insulation, but need to keep an array of separate frames for different box sizes and shapes in store. Such frames, because of their high assembly cost, have made batch production systems other than mass production systems impossible. Due to their considerable thickness and inability to be folded up, the foamed polystyrene resin-made box members have had an additional defect of needing much space for transportation and storage. Still other defects have been that when a plurality of packed boxes are stacked up, the underlying ones are likely to break down, deform or collapse due to a strength shortage.

Conventional corrugated cardboards, on the other hand, have had the advantage of being able to be folded up and carried in sheet forms to places where they are packed and occupy less space during storage, but their disadvantage has been that they are far from satisfactory in terms of heat insulation.

In recent years, corrugated cardboards in which either one of both their liners is laminated on its outer or inner face with a foamed plastic sheet have been proposed. However, their heat insulation is still less than satisfactory.

Nor is there any package to protect perishables or petals against heat while keeping them fresh.

In view of the defects associated with the prior art, it is an object of this invention to provide a heat-insulating corrugated cardboard which is small in volume and light in weight, accommodates easily to size and shape variations, is folded up into a sheet which is easily placed on another during transportation and storage, is readily assembled into the required shape in use and is much superior in heat insulation to conventional ones, or a corrugated cardboard which is much more effective for protecting flowering plants or perishables against heat while keeping them fresh, as compared with conventional ones, or a corrugated cardboard which protects the content against scratching/scuffing and shock, possesses high water-resistant strength and a suitable degree of moisture permeability and has an internal humidity regulating function. Another object of this invention is to provide a method for making such corrugated cardboards.

SUMMARY OF THE INVENTION

According to one aspect of this invention, the above-mentioned object is achieved by the provision of a corrugated cardboard in which a foamed plastic sheet provided with a specific skin layer and having a closed-cell content of at least 70% is used as the corrugated core sheet.

Another aspect of this invention is directed to a corrugated cardboard according to the first aspect, wherein a plastic film or films is or are laminated on one side or both sides of the foamed plastic sheet, thereby providing a package member which is light in weight, excels in heat insulation, has more improved water-resistant strength and insures improved protection against heat and freshness.

A third aspect of this invention is directed to a corrugated cardboard in which shielders are provided in grooves in the corrugated core sheet to prevent vagrant movement of air in it, thereby achieving much more improved protection against heat. In this connection, it is understood that the use of a skin layer-free foamed plastic sheet for the corrugated core sheet is somewhat, if not seriously, less effective.

A forth aspect of this invention is directed to a corrugated cardboard according to any one of the first to third aspects, which is laminated on one side with a foamed plastic sheet, thereby providing more improved protection of the matter packed against heat, scratching/scuffing and shock.

A fifth aspect of this invention is directed to a method for making a corrugated cardboard according to any one of the first to fourth aspects.

Taken altogether, the present invention contemplates improving the heat insulation of a corrugated cardboard, cutting off its air permeation and increasing its compression strength by laminating a plastic film or films on one side or both sides of its corrugated core sheet.

BRIEF DESCRIPTION OF THE DRAWINGS

The present invention will now be explained more specifically and illustratively, but not exclusively, with reference to the accompanying drawings, in which:

FIG. 1 is a sectional view of one standard heat-insulating corrugated cardboard according to this invention;

FIG. 2 is a perspective view showing a part of a heat-insulating corrugated cardboard according to this invention;

FIG. 3 is a view of the corrugated cardboard according to this invention, sectioned along Line A—A of FIG. 2;

FIG. 4 is a view of the corrugated cardboard according to this invention, sectioned along Line B—B of FIG. 3;

FIG. 5 is a view of the corrugated cardboard according to this invention, sectioned along Line C—C of FIG. 3;

Figure 6:
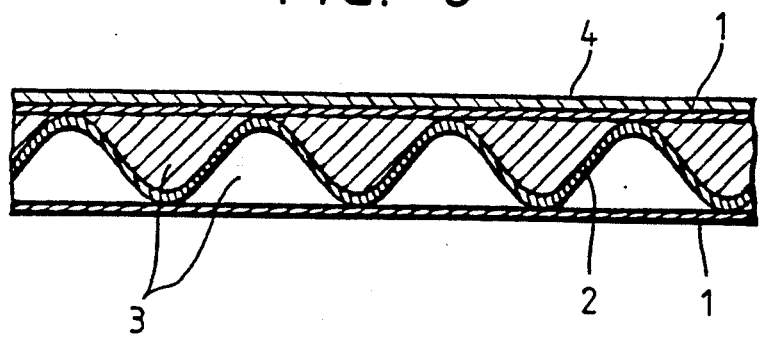
FIG. 6 is a sectional view of a heat-insulating corrugated cardboard according to this invention, wherein a foamed plastic sheet 4 is laminated on one side of a corrugated core material 2 through a paperboard liner 1, the plastic sheet including a skin layer.

Throughout the drawings, reference numeral 1 stands for a paperboard liner, 2, a foamed plastic corrugated core material having a skin layer, 3. a shielder, 4, a foamed plastic sheet and 5, a plastic film.

DETAILED DESCRIPTION OF THE INVENTION

The heat-insulting corrugated cardboard according to this invention is characterized in that its corrugated core material 2 is in a sheet form having a thickness of 0.7 to 7.0 mm. At less than 0.7 mm any heat-insulting effect is not expected, while at higher than 7.0 mm sufficient heat insulation is achieved, but difficulty is involved in corrugation processing. In this invention, it is essentially required that the skin layer is in 4 to 150 $\mu$m in average cell diameter, as measured in section, and applied at least on one side of the core sheet 2 at an average thickness of 100 $\mu$m to 700 $\mu$m inclusive, and the core sheet be 10 to 1,000 $\mu$m, preferably 10 to 500 $\mu$m in average cell diameter, as measured in section. Larger cell diameters are not desirable due to a drop in heat insulation.

By definition, what tells the skin layer from the core sheet is at their average cell diameter ratio of 1:1.8. More specifically, the core sheet material comprises a foamed plastic sheet 2 which is at least about 1.8 times as great as the skin layer in terms of average cell diameter, as measured in section, and has an average foaming factor of 8 to 40. The plastic sheet 2 is bonded on both sides with paperboard liners 1. In addition, the corrugated core sheet 2 may be provided with shielders 3 in its grooves, and may further be laminated on one side with a foamed plastic sheet 4 through the paperboard liner 1 (see FIG. 6). It is noted that the mean cell diameter in section of the skin layer and of core sheeting of the corrugated core sheet 2 are defined to be a divident-/divisor, the divident being the total size in section of cells in the skin layer and core sheeting of the corrugated core sheet 2 and the divisor being the number of cells. In the present invention, the mean foamed factor of the foamed plastic sheet is fixed at 8 to 40 for the reasons that only poor heat-insulating effects are achieved at a factor of less than 8, while there is an increase in the cell diameters and hence a lowering of heat insulation at a factor of higher than 40.

Figure 7:
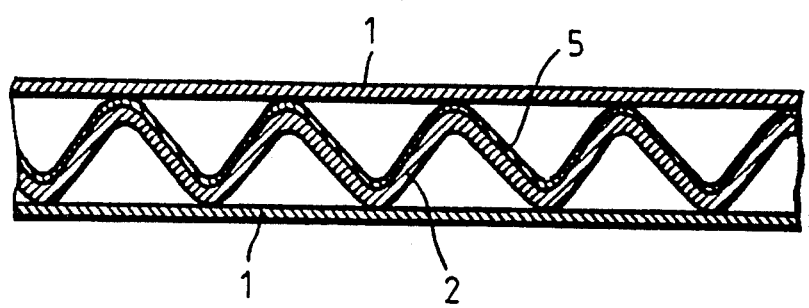
FIG. 7 is a sectional view of a heat-insulating corrugated cardboard in which a plastic film 5 is laminated on one side of a corrugated core material 2.
Figure 8:
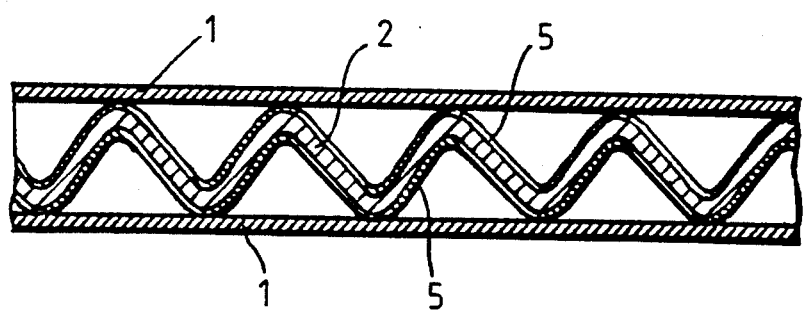
FIG. 8 is a sectional view of a heat-insulating corrugated cardboard in which plastic films 5 are laminated on both sides of a corrugated core material 2.

FIGS. 7 and 8 shows two embodiments of this invention wherein a plastic film or films 5 is or are laminated on one or both sides of a corrugated core sheet 2. The plastic film 5, for instance, may be formed of polyester, polyethylene, polystyrene, polypropylene, polyamide, nylon, polyvinyl alcohol, vinyl chloride, vinylidene chloride and all other available plastics. The lamination of the plastic film serves well to prevent its collapse owing to a pressure used for bonding the associated liners to the corrugated core sheet.

Preferably, the plastic film should have a thickness of 5 to 50 $\mu$m. At below 5 $\mu$m, it is likely to crimp or break, thus giving rise to not only a processing problem but also a limited improvement in compression strength. At higher than 50 $\mu$m, on the other hand, it contributes to an increase in compression strength, but results in cost rises. Thus, the upper thickness limit is fixed at 50 $\mu$m from the economical standpoint.

As described above, the corrugated core sheet 2 of the heat-insulating corrugated cardboard according to this invention includes at least one side a skin layer having a mean cell diameter of about 4 to 150 $\mu$m at a thickness of about 100 to 700 $\mu$m, with the core sheeting being formed of a foamed plastic sheeting by corrugation processing, having a mean cell diameter of 10 to 1,000 $\mu$m in section and being at least about 1.8 times as high as the mean cell diameter in section of the skin layer, and has paperboard liners 1 bonded to its both sides. To make clear the effect of the skin layer provided on the corrugated core sheet 2, two uncorrugated, 3 mm thick flat sheets of foamed polyethylene, one having a skin layer and the other otherwise, were tested for their insulation effectiveness according to ASTM method. From the results, reported below, it has been found that the skinned sheet is much superior in insulation effectiveness to the control sheet.

|  | Foamed Polyethylene | |
|---|---|---|
|  | (A) Skinned | (B) Control |
| 1. Mean cell diameter of skin layer in $\mu$m | 81 | — |
| 2. Skin layer thickness in $\mu$m | 100 to 150 | — |
| 3. Mean cell diameter of core sheeting in $\mu$m | 258 | 304 |
| 4. Insulation effectiveness in % | 54.7 | 50.9 |
| 5. Mean foaming factor | about 30 (26.7 measurements) | about 30 (27.5 measurements) |
| 6. Thickness in mm | about 3 (2.9 measurements) | about 30 (2.8 measurements) |

Then, the effect of the shielders 3 on the insulation effectiveness of a box package was measured, which included a corrugated core sheet 2 obtained by corrugating a flat foamed plastic sheet.

Figure 9:
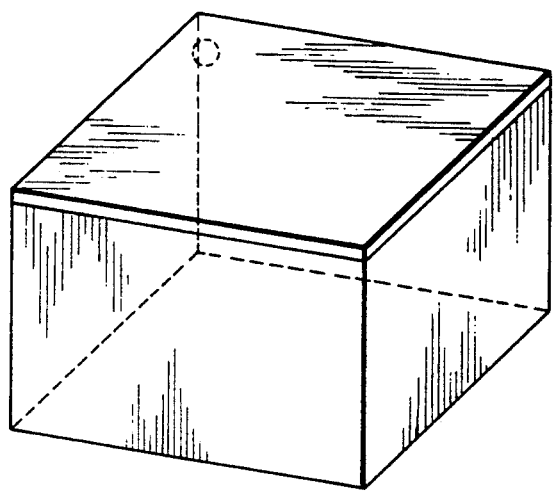
FIG. 9 is a perspective view of a box structure of a heat insulation measuring unit.
Figure 10:
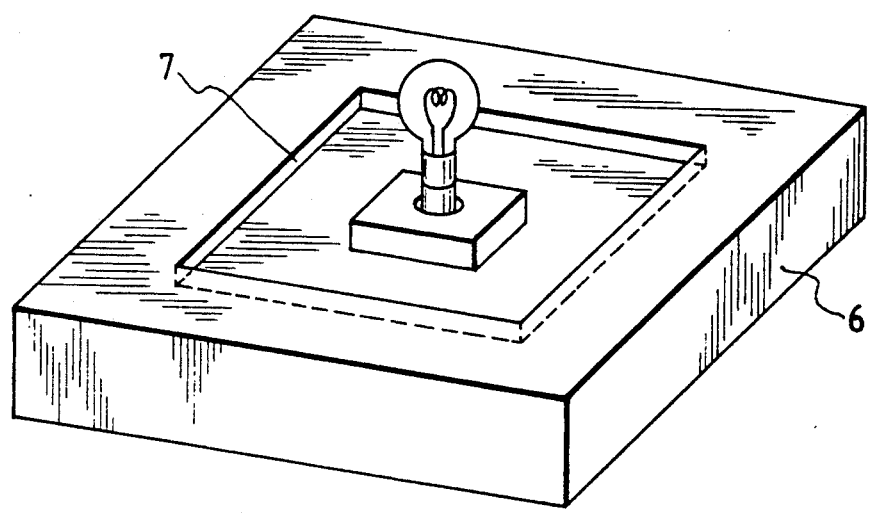
FIG. 10 is a view illustrative of a bottom plate of the measuring unit.

Referring it in more detail, a 20 cm long corrugated cardboard under test was formed, with a synthetic rubber-based banding agent, into a hexahedron with each plane of 20 cm × 20 cm in size (one plane of which was blanked out)—see FIG. 9, and cellophane tapes were applied to the apexes to prevent any possible air leakage through them. There was provided an about 10 cm thick block 6 (FIG. 10) of foamed polystyrene, which was such grooved—at 7—to a depth of about 1 cm as to receive the above-mentioned hexahedral box. Then, a bulb socket was mounted at the central region of the block 6 such that the filament of an incandescent electric lamp, once in place, was located about 7 cm above the upper plane of the block 6 (see FIG. 10). Finally, thermocouples for measuring temperature (provided with a light shielding cover for eliminating the influence of direct radiant heat from the lamp) were placed near the the upper corners of the inner sides of the hexahedral box.

The hexahedrall corrugated cardboard box under test was set in the groove 7 in the block 6 with the blanked-out plane down. Then, the in-box temperature was measured at time intervals of 2 seconds by the thermocouples while the incandescent lamp was powered at a power consumption regulated to 25 W with a d.c. stabilization power source. After the constant temperature had been reached, an additional long heating was continued at the regulated power consumption to obtain temperature readings. It is noted that the higher the in-box temperature readings, the better the insulation effectiveness, and vice versa.

With the above-described testing equipment and procedure, measurement was made of corrugated core sheets which were formed of normal paperboard and provided with shielders at varied intervals. The results are set out below.

| Spaces between shielders (cm) | 1 | 3 | 7 | 10 | 15 | Without shielders |
|---|---|---|---|---|---|---|
| In-box temperature (°C.) | 60.4 | 60.7 | 59.5 | 58.7 | 58.4 | 57.3 |

From the above-mentioned results, it has been found that the provision of the shielders in the grooves in the corrugated core sheets contributes to an increase in insulation effectiveness. Referring to the space between the shielders, it has turned out that the smaller the space, the slightly better the heat insulation, although this is true of a space of up to 3 cm. At too small a space there is a lowering in heat insulation due to the heat conductivity of the shielders themselves. From cost-effectiveness analysis, however, the best results would be practically obtained by cutting off vagrant movement of air through the grooves in the core sheet at both ends of the box package.

The foregoing are the results obtained with the corrugated core sheets provided on one side with shielders in the hexahedron testing manner. Set out below are the results obtained for the insulation effectiveness of corrugated core sheets provided on both sides with shielders.

| Space between shielders (cm) | 1 | 3 | 15 |
|---|---|---|---|
| One side (°C.) | 60.4 | 60.7 | 58.4 |
| Both sides (°C.) | 61.3 | 61.8 | 58.9 |

As can be understood from the above-described results, it is desired that a corrugated core sheet be provided at both sides with shielders, because more insulation effectiveness was achieved with the core sheet shielded on both sides than with the core sheet shielded on one side, but even a core sheet shielded on one side would be expected to produce considerable insulating effects. Where some insulation effectiveness is needed with as thin a core sheet as possible, however, it is more advantageous to provide shielders on both sides of corrugated core sheets. The shielders may be formed on the corrugated core sheets simultaneously with, or subsequent to, the preparation of the latter.

The heat insulation of various corrugated cardboards was measured according to ASTM method, and is set out below in terms of insulation effectiveness.

(1) Conventional corrugated cardboard of 5 mm in thickness which had paperboard liners on both sides and included a corrugated core paperboard sheet. Insulation effectiveness: 42.7%.

(2) Skin layer-free, corrugated core sheet of foamed polyethylene which had paperboard liners on both sides. Insulation effectiveness: 61.7%.

(3) Skinned, corrugated core sheet of foamed polyethylene which had paperboard liners on both sides. Insulation effectiveness: 63.1%.

From the above-mentioned results, it has been found that the provision of the skin layer contributes to an increase in insulation effectiveness.

Samples (2) and (3) are both higher than Sample (1) in insulation effectiveness. However, the skin layer-free sample (2) is slightly lower than the skinned sample (3). The reason is presumably that some skin layer has been formed on the surface of the foamed polyethylene sheet during its corrugation.

Measurement was taken of corrugated core sheets prepared by using foamed polystyrene in place of foamed polyethylene.

(4) Inventive Product A

Including a skinned, corrugated core sheet of foamed polystyrene and having paperboard liners on both sides.

Insulation effectiveness: 64.0%.

(5) Inventive Product B

Including a skinned, corrugated core sheet of foamed polystyrene, laminated on both sides with films, and having paperboard liners on both sides.

Insulation effectiveness: 64.5%.

(6) inventive Product C

Including a skinned and shielded, corrugated core sheet of foamed polystyrene and having paperboard liners on both sides.

Insulation effectiveness: 65.0%.

(7) Inventive Product D

Including a skinned, corrugated core sheet of foamed polystyrene and having a paperboard liner on one side and a foamed polystyrene sheet laminated on the other side through a paperboard liner.

Insulation effectiveness: 73.4%.

As can be clearly seen from the above-mentioned results, the inventive products are much higher than the conventional corrugated cardboards in terms of heat insulation.

Provided were an about 420×280×200 mm box formed of polystyrene by injection molding and a box made with one of the inventive products (which was 7 mm in thickness, had 25 μm thick, high-impact films laminated on both sides of the core sheet and included paperboard liners on both sides), each containing 2 kg of a coolant. The boxes were kept stationary in a constant-temperature room of 20° C. for 12 hours, followed by measuring the in-box temperatures. They were both found to be maintained at about 13° C. or less, indicating that the inventive product was virtually equivalent to the injected polystyrene box in terms of heat insulation.

Usually, corrugated cardboards are so largely affected by humidity that their strength drops. By contrast, the inventive product is so unlikely to be affected by humidity that its drop of compression strength by moisture can be largely limited. Samples pretreated according to JIS Z 0203 were subjected to corrugated cardboard compression strength tests according to JIS Z 0401 (vertical compression tests). The results are reported below.

| Compression Strength (kgf/50 mm) | | |
| --- | --- | --- |
| | Temperature: 29° C., Relative humidity: 65% | Temperature: 30° C., Relative humidity: 90% |
| General currugated cardboard A | 25.06 | 11.36 |
| Inventive product (of 5 mm in thickness and having a 23/100-mm core sheet) | 53.0 | 39.2 |
| Cardboard (of 5 mm in thickness and having a 2 mm core sheet laminated on both sides with films) | 60.0 | 43.9 |

Note:
Core mean cell diameter - 221 μm.
Skin mean cell diameter - 98 μm.
Skin thickness - 110 to 250 μm.

After water dipping treatments following residual vertical strength tests according to JIS Z 1537, the samples were measured for their water-resistant strength according to the JIS Z 0401 residual vertical compression strength tests. The results are given below.

| Water-Resistant Strength (kgf/50 mm) | | |
| --- | --- | --- |
| | Temperature: 20° C. Relative humidity: 65% | 1-hr water dipping |
| General currugated cardboard A 1 | 25.06 | 0 |
| Inventive product (of 5 mm in thickness and having a 23/100 mm core sheet) | 53.0 | 12.5 |
| Cardboard with core sheet laminated on both with films sides | 60.0 | 17.2 |

Note:
Core mean cell diameter - 226 μm.
Skin mean cell diameter - 102 μm.
Skin thickness - 110 to 260 μm As can be seen from the above-mentioned results, the inventive product has an additional feature of being unlikely to degrade by humidity.

With box packages obtained according to this invention, such frozen aquatic products as frozen lobsters or bluefins were packed for transportation and storage. They were found to undergo little, if any, degradation by hygroscopicity. Even when the boxes were stacked up over an extended period of time, the underlying ones did not break at all. Their improved heat insulation also served well to keep such products fresh.

A package having a core sheet laminated on both sides with films is comparable to a JIS Grade No. 4 corrugated cardboard, and has an increased water-resistant strength.

The corrugated cardboards according to this invention is particularly effective for keeping perishables or flowering plants fresh.

For instance, such agricultural and aquatic products as opened and dried saurels were frozen for low-temperature distribution. They were placed in a box package according to this invention and a conventional corrugated cardboard package, re-frozen in an air-blast freezer at −50° C. and subsequently allowed to stand at room temperature to monitor temperature rises. After the room temperature (28° C.) had been reached, measurement was then taken of the POV value in meg/kg (a lipid or peroxide value determined after extraction with ethyl ether) and K value in % (a value determined with a K value meter after extraction with a 10% TCA solution and neutralization with a KOH solution or an index to how fresh fish and shellfish are; the lower this value, the more pleasant the taste) of the products. The results are given below.

| | Functional judgement | POV (meg/kg) | K value (%) |
| --- | --- | --- | --- |
| Conventional package | yellowing found | 4.1 | 62.5 |
| Inventive package | no yellowing | 2.9 | 47.4 |
| O: Organoleptic assay. | | | |

Tests were also made of how long the freshness of vegetables or cut flowers was kept. For the purpose of delivering perennial babies'-breathes, provided were a general corrugated cardboard package, a package formed of polystyrene by injection molding and a corrugated cardboard package having a corrugated core sheet of foamed plastic. In terms of heat-insulating effects, the polystyrene and inventive packages were found to be much superior to the general corrugated cardboard one. Another measurement was taken of the concentration of ethylene gas emissions found within the package samples at the end of delivery, which is considered to have a serious influence on wilting of fresh flowering plants, etc. The polystyrene and usual packages had concentrations of 69 ppb and 47 ppb, respectively, in sharp contrast to 35 ppb found in the inventive sample; this indicates that the inventive sample is far superior to the control samples. This is because the polystyrene sample provided rapid emission of ethylene gas due to in-box temperature rises, while the usual sample gave off more ethylene gas due to its inferior heat insulation in spite of its good air permeation.

A further investigation was made of how long the freshness of boiled green soybeans was kept during transportation. As a result, it was found that the inventive sample was inferior to the polystyrene sample in terms of heat insulation, but there was no appreciable difference between them in terms of the total content of sugar determined after delivery.

Flowers were arranged in vases formed of the heat-insulating corrugated cardboard according to this invention and an ordinary corrugated cardboard. The flowers set in the vase according to this invention was less in the rate of reduction of moisture and so remained lush.

| | Control Sample | Inventive Sample |
| --- | --- | --- |
| Water reduction rate | 8.7% | 2.9 to 3.7% |
| Wilting of the leaves | Wilted and headed downward | not found |

The inventive sample, because of having a moderate degree of moisture permeation or hygroscopicity (JIS Z 0208), is unlikely to have an adverse influence upon the content due to moisture accumulation, unlike the foamed polystyrene sample. Nor is it likely that the content may be deprived of moisture to an overdry state.

| Moisture Permeability | |
|---|---|
| Ordinary corrugated cardboard: | 1056 g/m² · 24 hr (40° C. and 90 R.H.). |
| Injected, foamed polystyrene: | 55.5 g/m² · 24 hr. |
| Inventive product having no film: | 202 g/m² · 24 hr. |
| Inventive product having a core sheet laminated on both sides with 25-μm thickness, high-impact polystyrene films: | 122 g/m² · 24 hr. |

As set out above, the inventive product is designed to transmit moisture moderately, as expressed in terms of a moisture permeability of 122 g/m²·24 hr. However, even if a flat sheet of foamed polystyrene is provided on both sides with flat, high-impact polystyrene films, it is then found to transmit little or no moisture, as expressed in terms of a moisture permeability of 32.1 g/m²·24 hr.

In the description that follows, reference will now be made to how to prepare the heat-insulating corrugated cardboard according to this invention. According to the first method, use is made of a plastic sheet which has been subjected to primary foaming or otherwise foamed incompletely. This sheet is heated in foaming equipment to a deformation temperature plus (10 to 50) °C. at which it is subjected to secondary foaming simultaneously with forming a skin layer on at least one side thereof. After that, the sheet is passed between a pair of toothed corrugating rolls maintained at 30° to 90° C. and adapted to be in mesh with each other, followed by cooling. The thus corrugated, foamed plastic sheet was applied on its apexes with a bonding agent, and is then passed between two rolls with paperboard liners placed on both sides, followed by heating. If required, the resulting sheet may be cut into a given size.

Alternatively, a plastic film which has been subjected to primary foaming or otherwise foamed incompletely is passed down through vertically arranged heater equipment to heat it to a deformation temperature plus (10 to 50) °C., at which it is subjected to secondary foaming simultaneously with forming a skin layer on at least one side thereof. The thus skinned, foamed plastic sheet is then passed between a pair of toothed corrugating rolls, which are maintained at 30° to 90° C. and located oppositely with a given space therebetween such that they are adapted to be in mesh with each other. Through the corrugating rolls the sheet makes its way horizontal, followed by cooling. After that, the thus corrugated, foamed plastic sheet was applied on its apexes with a bonding agent, and then passed between two rolls with paperboard liners placed on its both sides, followed by heating. If required, this sheet may be cut and shaped into a given size.

According to one modification of a pair of toothed corrugating rolls, the female roll of said pair of toothed rolls, is provided with small holes in its troughs, so that the interior of its portions meshing with the male one is evacuated to vacuum. According to another modification, the male roll of said pair of toothed rolls, is provided with small holes, so that compressed air can be blown in the interior of the periphery of its portion meshing with the female one, thereby injecting said compressed air into said small holes.

In order to make a corrugated cardboard including a corrugated core sheet having a plastic film laminated on the surface, that plastic film may be prelaminated on the primarily foamed plastic sheet.

EXAMPLES

Example 1

Figure 12:
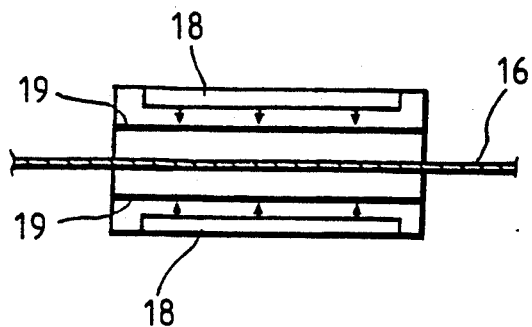
FIG. 12 is a view illustrating how to effect heating in an infrared ray foaming unit.
Figure 13:
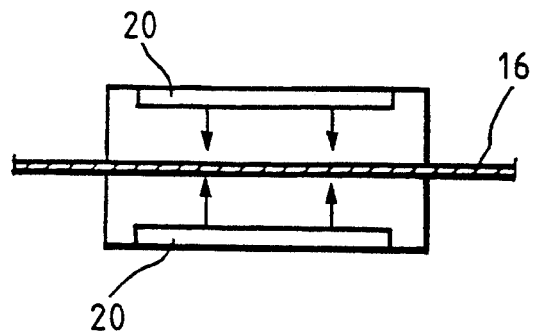
FIG. 13 is a view illustrating how to effect heating in a far infrared ray foaming unit.

The first method will now be explained in greater detail with reference to FIGS. 11 to 13.

Figure 11:
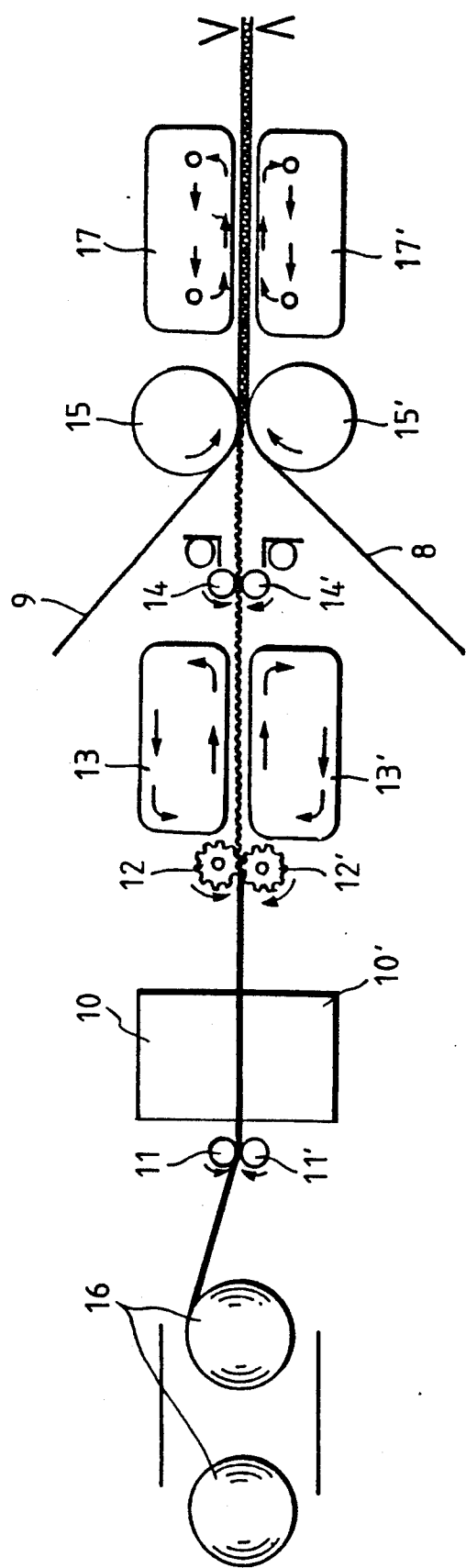
FIG. 11 is a schematic view of the steps of making the inventive product.

Referring to FIG. 11, a foamed polystyrene sheeting 16 in a rolled form, which has been primarily foamed to a foaming factor of 6 to 12 and is to be secondarily foamed, is fed into foaming equipment 10 by means of feed rolls 11 and 11', in which it is heated to an average resin temperature of 120° C. to subject it to secondary foaming simultaneously with forming skin layers on both its sides. After that, the thus foamed sheeting is passed between a pair of toothed rolls 12 and 12' regulated to an angle of about 40 to 60° C. with a clearance therebetween, which is 0.1 to 2-mm smaller than the foamed sheet, thereby increasing the volumes of the skin layers. Then, the foamed polystyrene sheeting 16 is cooled on its both sides to around 40° C. with air blowers 13 and 13' to prepare a corrugated core sheet 2.

This corrugated core sheet 2 is a corrugated, foamed polystyrene sheet having a closed-cell content of 70% or more, having on both sides the skin layers, each being 102 μm in mean cell diameter in section and having a thickness of 350 μm, with the core sheeting 16 being 226 μm in mean cell diameter in section or having a sectional mean cell diameter of 1.8 times or more as great as that of each skin layer. Then, the corrugated core sheet 2 receives a bonding agent—in an amount of 20 g/m² calculated as solid matter—for adhesive applicators 14 and 14', e.g. reverse roll coaters. In this case, the bonding agent may be spread all over the surfaces of paperboard liners 8 and 9, but this makes moisture permeability worse. Subsequently, the corrugated core sheet 2 is passed between two rubber rolls 15 and 15' at a pressure regulated to 1000 g/cm² or less, during which the paperboard liners 8 and 9 are guided, bonded and laminated onto the corrugated core sheet 2. If required, it may be advantageous to subject the liners 8 and 9 to preheating or premoisture conditioning. The corrugated core sheet 2 is then passed through driers 17 and 17' regulated to normal temperature to 60° C., preferably about 40° C. to complete bonding. Subsequently or if necessary, the sheet may be cut and shaped. The above-described operation was carried out at a speed of 12 m/minute.

With the foaming machine 10 for secondary foaming, heating may be carried out in the following two manners. As shown in FIG. 12, a metal sheet 19 is uniformly heated by means of an infrared ray generator 18 to produce radiant heat, thereby heating the foamed polystyrene sheet 16 for its secondary foaming. Alternatively, as shown in FIG. 13, a far infrared ray generator 20 may be used to heat the foamed polystyrene for its secondary foaming.

With the first-mentioned method, it is required to increase the surface temperature of resin to a level sufficient to heat the central region of the sheet 16, giving rise to a fear that the skin layers may decrease in volume. Thus, the second-mentioned method is preferable. In other words, it is preferable to offer control over the sheet 16 by measuring and regulating its surface temperature, thereby achieving uniform corrugation of the sheet and reducing shrinkage of the sheet as much as possible. It is noted that a foamed polyethylene sheet could be used in place of the foamed polystyrene sheet by increasing the processing temperature by about 10° C.

Example 2

Figure 14:
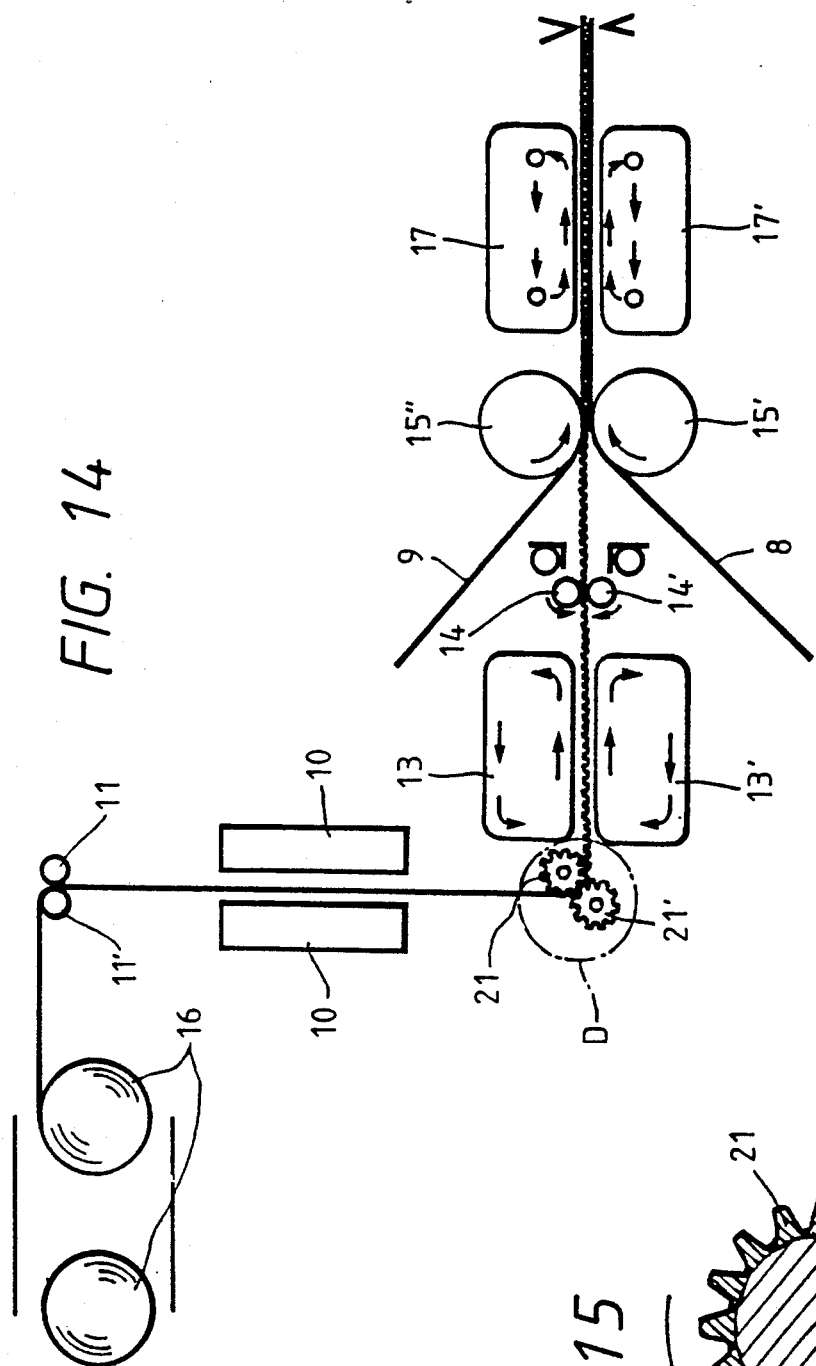
FIG. 14 is a view of the steps described in Example 2, which operates in a vertical fashion.
Figure 15:
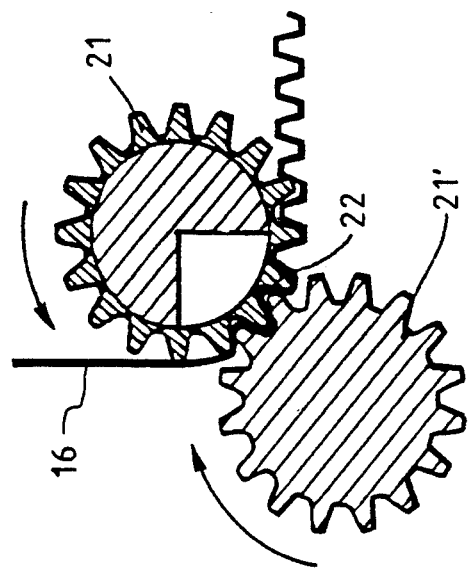
FIG. 15 is an enlarged sectional view of toothed rolls.

This example is directed to the second method, which is virtually identical with the first method except that, as illustrated in FIG. 14, a primarily foamed polystyrene sheeting is first passed down through foaming equipment and then fed horizontally through the rest of the system operated in similar manners as described in Example 1. With the first method, it is unlikely that the polystyrene sheeting 16, when heated at the foaming step, may sag so that it comes into contact with the foaming equipment, thus offering some inconvenience. It is thus required to keep a sufficient distance between the underside of the sheeting 16 and the foaming unit, resulting in a difference between the two sides of the sheeting which is heated, or a drop in the efficiency of heating. With the second method designed to feed the sheeting vertically at the first step, however, such problems can be solved.

More illustratively, a foamed polystyrene in a rolled form, which has been primarily foamed at a foaming factor of 5 to 10 and is to be secondarily foamed, is supplied down through a vertical type of foaming equipment 10, in which it is heated on its both sides to a resin temperature of 120° to 130° C., thereby subjecting it to secondary foaming simultaneously with forming skin layers on both sides of the sheeting 16. After that, the sheeting 16 is maintained at 40° to 60° C. and then passed between metallic embossing rolls 21 and 21' for processing and diverting it. A pair of embossing rolls 21 and 21' are designed to be in light mesh with each other, as can be seen from a circle indicated by a dotted line, while the clearance is suitably regulated depending upon the thickness of the foamed polystyrene sheet to be processed. Once diverted horizontally, the sheeting is cooled by air blowers 13 and 13', receives a bonding agent from adhesive applicators 14 and 14' while paperboards 8 and 9 are guided onto its both sides, is supplied between a metallic roll 15" and a rubber roll 15' for press lamination, and is fed through a dryer 17 for solidification and drying to obtain a corrugated cardboard product, as with the method described in Example 1. If required, the cardboard product may be cut and shaped.

Example 3

In this example, an embossing roll 21 for corrugation processing is provided with an array of holed bosses 22, on which vacuum acts to bring a foamed polystyrene sheeting 16 in close contact with them, thereby preventing its disengagement. The procedures of Example 2 were substantially followed with the exception that after leaving adhesive applicators, the feed was passed between two metallic rollers, thereby manufacturing a corrguated cardboard for keeping perishables, etc. fresh.

This effect could be further increased by providing the associated embossing roll 21' with small holes and injecting compressed air from within the roll therethrough.

It is understood that the shape retention of the polystyrene sheeting can be accelerated by the injection of precooled, compressed air.

Example 4

Figure 16:
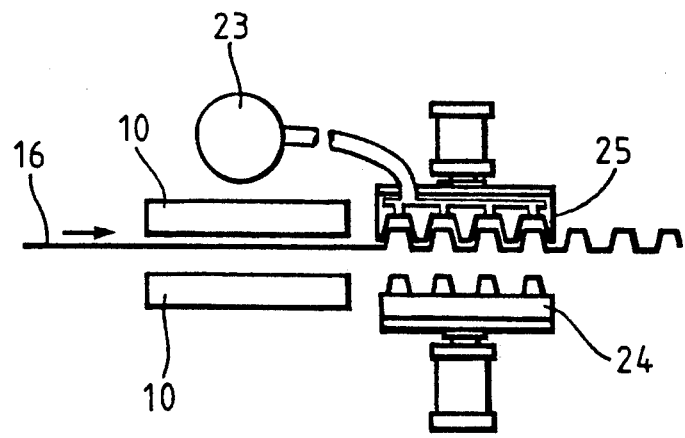
FIG. 16 is a view illustrating the batchwise production described in Example 4.

With such embossing equipment as shown in FIG. 16, a core sheeting was corrugated, and then processed to a corrugated cardboard in a batchwise fashion under the same conditions as described in Example 1. In FIG. 16, reference numeral 10 stands for foaming units, 23, a vacuum tank, 14, a male plug and 15, a female mold.

Example 5

A cardboard package (of 7 mm in thickness and with a core sheeting of foamed polystyrene and paperboard liners on its both sides) according to this invention and a general-purpose corrugated cardboard package, both packed with carnations produced in the northeastern section of Japan, were carried by a normal version of truck to Tokyo.

The cardboard package according to this invention was prepared as follows.

A primarily foamed polystyrene sheeting, which had a thickness of 1.6 mm and a mean foaming factor of 9, were provided with skin layers, each of 120 to 200 $\mu$m in thickness and 71 $\mu$m in average cell diameter and included a core sheeting having a mean cell diameter of 174 $\mu$m, was secondarily foamed and processed according to the first method into a corrugated sheet, which had a thickness of 3.1 mm, a closed-cell content of 90% or more and an average foaming factor 17, was provided with skin layers, each of 11 to 260 $\mu$m in thickness and 102 $\mu$m in average cell diameter and includes a core sheeting of 226 $\mu$m in average cell diameter. Then, the core sheet was laminated on its both sides with paperboard liners into a corrugated cardboard sheet, which was in turn formed into a box package.

The package, 800 mm long, 320 mm wide and 105 mm high, contained 3 kg of a coolant. Both the packages were unpacked eight hours after arrival. The flowering plant and leaves removed from the control package wilted to a considerable degree. The carnations removed from the inventive package, however, remained as lush and fresh as packed.

Example 6

Box packages were obtained using corrugated cardboard sheets, each including a core sheet laminated on both its sides with 25 $\mu$m thick high-impact polystyrene films according to the procedures of Example 1. Frozen lobsters, 15 kg in total weight but 12 kg in net weight, were moved from a refrigerator warehouse into each of the packages, 64.5% in insulation effectiveness (measured according to ASTM method), 15.9 kgf/50 mm (according to the JIS Z0401 residual vertical compression strength) and 500 mm long×260 mm wide×215 mm high. The packages, along with control ones, were reciprocated between Tokyo and the Saitama district. The control packages were so embrittled due to water leakage that there was a serious degradation of freshness of the lobster.

The inventive packages suffered no embrittlement. Nor did the underlying ones broke. Freshness of the lobsters was good.

As a replacement to conventional packages formed of foamed polystyrene by injection molding, it has been attempted to make use of collapsible, corrugated cardboard packages laminated thereon with heat-insulating foamed plastic (PE, PS, PP, etc.) sheets, aluminium foils or aluminized (PET, PE, PP, etc.) films, thereby improving their heat insulation. However, they are still short of coming up to the heat insulation standards now demanded on the market. Thus, there is a strong demand toward developing packages in keeping with such standards. However, this demand will be satisfied by the present invention providing a package in which a skinned, foamed plastic sheet is used as the core sheet of a corrugated cardboard to improve its heat insulation to a much higher level. Further improvements in heat insulation is achieved by providing shielders on the core sheet. Thus, the present invention has succeeded in providing a corrugated cardboard package which is collapsible and nearly equivalent in heat insulation to foamed polystyrene injection moldings.

According to this invention, it is also possible to prevent harmful gases or smells from entering packages and keep the in-package humidity at proper levels. It is understood that the packages according to this invention are superior in insulation effectiveness to aluminized, general-purpose corrugated cardboards, despite their limited wall thickness.

Much more improvements in heat insulation and compression strength are achievable by laminating a plastic film or films on one or both sides of the corrugated core sheet according to this invention. This is particularly advantageous when a number of packages are to be stacked up.

As detailed above, the keep-fresh, heat-insulating corrugated cardboard according to this invention has paperboard liners on its both sides and includes a corrugated core sheet formed of a foamed plastic sheet having a 100 to 700 μm thick skin layer formed on at least one side. Thus, it can be improved in heat insulation with no need of increasing the weight of materials.

Using the foamed plastic sheeting as the corrugated core sheeting in place of conventional corrugated cardboard is economically so advantageous because of very expeditious proccessing of shielders to be provided in the core grooves, and contributes well to achieving high heat insulation. Such shielders assures much more improvements in heat insulation. In addition, laminating an additional foamed plastic sheet on one side of the corrugated core sheet through the paperboad liner is effective for preventing the surface of the contents from being scratched or scuffed. Thus, the present invention provides a collapsible and lightweight packaging corrugated cardboard, which has a great advantage of being much higher in wetting strength than conventional corrugated cardboard and excels in the performance of keeping perishables fresh. The present invention also provides a method capable of making products having such effects as mentioned above at low cost and in simple manners. Thus, the present invention makes a great breakthrough.

What is claimed is:

1. A heat-insulating corrugated cardboard comprising a 0.7 to 7.0 mm thick corrugated core sheet of foamed plastic and paperboard liners bonded on both sides of the corrugated core sheet, said corrugated core sheet including a core sheeting and a 100 to 700 μpm thick cellular skin layer formed on at least one side of said core sheeting, said skin layer being 4 to 150 μm in sectional mean cell diameter, said core sheeting being 10 to 1,000 μm in sectional mean cell diameter, and said core sheet having an overall average foaming factor of 8 to 40 and a closed-cell content of at least 70%.

2. A heat-insulating corrugated cardboard as claimed in claim 1, wherein said corrugated core sheet is provided with shielders in its grooves.

3. A heat-insulating corrugated cardboard as claimed in claim 1 or 2, wherein said core sheet is laminated on one side with a foamed plastic sheet through the paperboard liner.

4. A heat-insulating corrugated cardboard as claimed in claim 3, wherein said foamed plastic sheet is laminated on one side or both sides with a plastic film or films.

5. A heat-insulating corrugated cardboard as claimed in claim 4, wherein said plastic film or films has or have a thickness of 5 to 50 μm.

* * * * *